April 7, 1936.  H. A. DEPEW  2,036,570
ZINC OXIDE
Filed Feb. 28, 1931
Fig. 1,
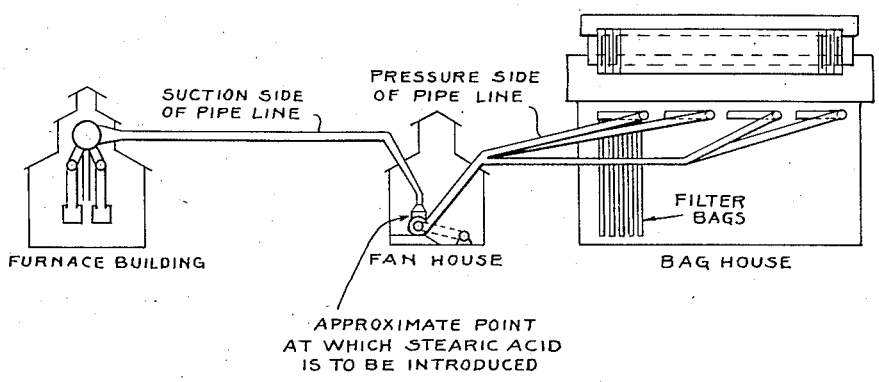
Fig. 2,
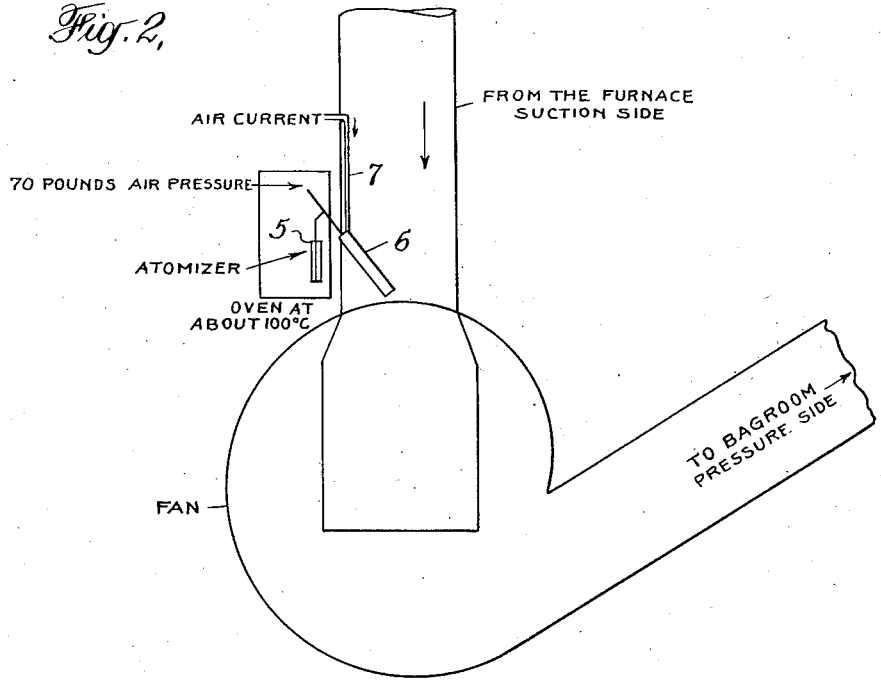
INVENTOR
HARLAN A. DEPEW
BY
ATTORNEYS Patented Apr. 7, 1936

2,036,570

UNITED STATES PATENT OFFICE 2,036,570

ZINC OXIDE

Harlan A. Depew, Palmerton, Pa., assignor to The New Jersey Zinc Company, New York, N. Y., a corporation of New Jersey Application February 28, 1931, Serial No. 519,007

5 Claims. (Cl. 134—78)

This invention relates to zinc oxide and has for its object the provision of certain improvements in the manufacture of zinc oxide and the provision, as a new article of manufacture, of the improved zinc oxide product resulting therefrom. The invention more particularly contemplates certain improvements in the production by the American or Wetherill process of a superior zinc oxide product especially adapted for use in rubber compounding.

Zinc oxide is extensively used in rubber compounds, practically all high grade rubber products containing it in amounts from a few per cent up to fifty per cent or more by weight. The incorporation of the zinc oxide in the rubber is effected in various types of rubber mills and mixers, the aim being to disperse the zinc oxide particles uniformly throughout the rubber. The ease of incorporation and uniformity of dispersion of the zinc oxide in the rubber depends, among other factors, upon the surface condition of the zinc oxide particles with special reference to the facility with which rubber wets these particles. Where the zinc oxide is made direct from a charge of ore and carbonaceous material, as in the Wetherill or American process, there is a marked tendency for certain impurities, notably sulphur-oxygen compounds, to adsorb or condense on the surface of the oxide particles. These impurities, and in particular sulphur dioxide, in some cases deleteriously affect the ease of incorporation and uniformity of dispersion of the oxide in rubber, and various proposals have been made for reducing the amount of such adsorbed impurities and for neutralizing their apparent deleterious effects.

I have discovered that the ease of incorporation and uniformity of dispersion of zinc oxide in rubber may be very substantially promoted by treating its surface with a substance soluble in rubber and able either to react with zinc oxide or to wet it well, so as to form a firm bond with it. Fatty acids are particularly suitable for this purpose, and the invention will be described below with special reference to their use; but it should be understood that any substance that is soluble in rubber and either wets or reacts with zinc oxide so as to become firmly bonded with its surface, and is otherwise adaptable for use in the process described below, may be substituted in whole or in part for fatty acids without departing from the spirit of the invention. Furthermore, it should be understood that the term "a fatty acid" as used herein includes ordinary commercial fatty acids, which consist of mixtures of various fatty acids.

Thus, a freshly cut surface of rubber containing ordinary untreated American process zinc oxide may show a number of white pellets of unmixed pigment and the surface may be rough, especially when the oxide is mixed in an internal mixer. When, however, the zinc oxide, prior to incorporation in rubber, is surface-treated according to the method of the invention, the appearance of a freshly cut surface of rubber is greatly improved and under optimum conditions the surface will be smooth with no specks.

When fatty acids are used in the method of the invention, such treatment results in the adsorption of the fatty acid molecules by the zinc oxide particles; such adsorption may result in the presence of scattered isolated molecules of fatty acid on the surface of the particles, or in the presence of a dense coating of fatty acid. The presence of the fatty acid on the surface may decrease the adsorption of sulfur compounds such as sulfur dioxide and will prevent these compounds, when they are adsorbed, from injuriously affecting the properties of the pigment; since the relatively long molecules of fatty acid tend to mask or cover up the sulfur dioxide or sulfur trioxide, and thus cause the surface of the pigment particles to take on the characteristics of a fatty acid surface. The presence of stearic acid molecules thus not only facilitates the wetting of the zinc oxide particles by rubber but also diminishes the interference of the adsorbed sulfur compounds with the wetting; the resulting increased facility with which rubber wets these particles increases the ease with which the zinc oxide can be incorporated in rubber.

Based on these discoveries, my present invention contemplates subjecting fumed zinc oxide particles, preferably while still in suspension in the gaseous product of the oxide-making process, to the action of an appropriate substance soluble in rubber, such as a fatty acid, and in particular stearic acid. The fatty acid may be introduced into the gaseous product of the oxide-making process at any appropriate point between the furnacing operation and the oxide collection. The fatty acid is preferably introduced into the oxide-pipe line in a finely divided form at a point where the prevailing temperature is sufficiently high rapidly to vaporize it in the large volume of gases. The fatty acid may be introduced in the form of its vapor, or in an atomized state, or in any other suitable form. It is my present preferred practice to add the fatty acid to the fume in the pipe line as described above; but the zinc oxide from the bag room may, after its collection, be redispersed in air and then treated with hot air containing fatty acid vapor; or hot air containing fatty acid vapor may even be blown through the zinc oxide without redispersing it.

Fig. 1 of the accompanying drawing is a very general diagrammatic view of a plant for making zinc oxide by the American or Wetherill process; and Fig. 2 diagrammatically illustrates an application of the present invention to that plant.

The zinc oxide plant comprises a furnace building in which are housed the oxide-making furnaces. The gaseous product of the furnacing operation is drawn into a flue system or pipe line by means of an appropriate fan and is forced, from the pressure side of the fan, into a bag house or other appropriate apparatus for collecting the zinc oxide. In passing through the flue system or pipe line connecting the oxide-making furnaces to the oxide collecting apparatus, the individual particles of zinc oxide are suspended in the gaseous product of the furnacing operation. In passing through the flue system, the temperature of the gaseous product is very substantially lowered so that the fume is delivered to the bag house at a temperature insufficiently high to damage the customary fabric filter bags. In accordance with the present invention, the zinc oxide particles are treated with a fatty acid while still in suspension in the gaseous product passing through the flue system. Preferably, this treatment of the zinc oxide with the fatty acid takes place at as high a temperature, and hence as near the furnace building, as practicable. Thus, the fatty acid may be advantageously introduced into the flue system on the suction side of the fan and in proximity thereto. It has been introduced successfully at temperatures as high as 400° C., and probably can be added at even higher temperatures.

In Fig. 2 of the drawing I have diagrammatically illustrated the introduction of the fatty acid in an atomized state. The fatty acid in a container 5 is atomized by a hot air blast, say of about 70 pounds per square inch pressure in the case of stearic acid. The atomizer is kept sufficiently warm due to its proximity to the hot oxide-pipe line to maintain the fatty acid (if not liquid at ordinary temperatures) in a liquid state. The fatty acid sprayed from the atomizer is diluted in a mixing nozzle 6 with hot air derived from an air supply pipe 7 carried within the oxide-pipe line to heat the air delivered to the nozzle 6. The nozzle 6 extends a short distance, for example an inch, into the oxide-pipe line. The fine spray of fatty acid is immediately evaporated at the relatively high temperature of the oxide-pipe line, so that it is in the vapor phase when it comes in contact with the solid zinc oxide particles. Instead of liquefying a solid fatty acid (such as stearic acid) by heat, the acid may be dissolved in an appropriate solvent thereof, such for example as a solution of stearic acid in gasoline.

I have introduced stearic acid into the flue system by passing air over a pan of heated stearic acid and sucking the resulting stearic acid vapor diluted with air into the pipe line, as for example, through the clean-out of the suction fan. Commercial stearic acid consists of a mixture of acids of different boiling points and the result is a cracking and condensation with a final black residue that cannot be used. Moreover, care must be constantly exercised to avoid spontaneous ignition of the hot stearic acid in the pan. A solution of the fatty acid in a suitable solvent, such as gasoline, may be sprayed into the hot pipe line where the fatty acid will promptly vaporize. The solvent is not essential, particularly in the case of fatty acids that are liquid at ordinary temperatures, but it simplifies metering the amount of fatty acid introduced and promotes the rate of vaporization of the acid. While it is now my preferred practice to use stearic acid, other fatty acids are available for the practice of the invention, more particularly the lower members of the homologous series such as lauric acid; and even acetic acid has been found to improve the mixing qualities.

While the invention is of particular advantage in the case of zinc oxides made direct from ore and carbonaceous material, where the presence of sulfur-oxygen compounds is almost inevitable, it may be applied with advantage to any French process zinc oxides, and generally to any process in which the zinc oxide is a fumed product. It is also to be understood that I include in the class of zinc oxides those zinc-lead pigments, commonly called leaded zinc oxides, consisting largely of zinc oxide.

The amount of fatty acid used depends to some extent on the average particle size of the zinc oxide, in general, the smaller the particle size the greater is the amount of fatty acid required. Ordinarily, from 0.07 to 1.5% by weight of the fatty acid on the weight of the zinc oxide gives satisfactory results. In actual practice, from 0.25 to 0.5% by weight of stearic acid has given excellent results with zinc oxides of an average particle size of from 0.1 to 0.3 microns.

The action of the fatty acid on the zinc oxide appears to be a surface phenomenon of adsorption. I am unprepared to describe the extent of the chemical reaction that takes place between the fatty acid and the zinc oxide, but it is probable that the film coating of the oxide particles consists, to some extent at least, of a compound of the fatty acid with zinc, such for example as zinc stearate where stearic acid is used.

It is, therefore, to be understood that when I herein speak of a zinc oxide product containing a fatty acid, or one whose particles are coated with a fatty acid, I intend to embrace in that language the presence of, or coating with, a zinc derivative of the fatty acid as well as the fatty acid itself.

The treatment of zinc oxide with fatty acids according to the invention increases the ease with which the zinc oxide can be incorporated in rubber in any of the usual types of rubber mills and mixers. This effect is probably due in part to the fact that molecules of fatty acid (such as stearic acid and the like) on the surface of the zinc oxide particles render them more easily wetted by rubber and consequently more easily dispersed in rubber. In some cases a further probable cause of the increased ease of incorporation may be the partial prevention of the adsorption of sulfur compounds by the zinc oxide and the masking of such sulfur compounds as are adsorbed by the presence of the long molecules of fatty acid.

The superior dispersibility of the improved zinc oxide of the invention enables the production of rubber stocks of higher tensile strength and of greater elongation and greater stiffness than is possible with the heretofore common brands of American process zinc oxide. The zinc oxide of the invention dusts more in the bag room and packer, screens faster and has a higher apparent density (requiring little or no packing)

than the heretofore common American process zinc oxides. It seems probable that these dusting, screening and packing properties of the improved zinc oxide are due in large part to the fact that the oxide does not "air flocculate" in the flue system to as great an extent as does ordinary American process oxide. The improved oxide of the invention takes up less moisture than does the heretofore known American process oxides, thereby reducing its tendency to change on storage, as well as reducing the amount of lumping in the bag. The fact that each particle of the improved zinc oxide seems to be insulated against the action of water by the coating of the fatty acid reduces the effect of absorbed moisture in causing lumping of the oxide.

I claim:

1. The improvement in the manufacture of a fumed zinc oxide product which comprises subjecting the zinc oxide particles while still in suspension in the gaseous product of the oxide-making process to the action of a fatty acid at a temperature sufficiently high to vaporize the fatty acid.

2. The improvement in the manufacture of a fumed zinc oxide product which comprises introducing an atomized fatty acid into the gaseous product of the oxide-making process at a point between the furnacing operation and the oxide collection at which the temperature of the gaseous product is sufficiently high to vaporize the fatty acid.

3. The improvement in the manufacture of a fumed zinc oxide product which comprises subjecting the zinc oxide particles while still in suspension in the gaseous product of the oxide-making process to the action of stearic acid at a temperature sufficiently high to vaporize the stearic acid.

4. The improvement in the manufacture of a fumed zinc oxide product which comprises introducing atomized stearic acid into the gaseous product of the oxide-making process at a point intermediate the furnacing operation and the oxide collection at which the temperature of the gaseous product is sufficiently high to vaporize the stearic acid.

5. The improvement in the manufacture of a fumed zinc oxide product which comprises subjecting the zinc oxide particles while still in suspension in a gaseous product of the oxide-making process to the action of the undecomposed vapor of a substance that is soluble in rubber and is adsorbable by the surfaces of the zinc oxide particles so as to become firmly bonded to said surfaces.

HARLAN A. DEPEW.